(12) United States Patent
Buchheim

(10) Patent No.: US 6,962,323 B2
(45) Date of Patent: Nov. 8, 2005

(54) APPARATUS COMPRISING A ROTARY-ACTING PILOT VALVE

(75) Inventor: Robert K. Buchheim, Coto de Caza, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/625,104

(22) Filed: Jul. 22, 2003

(65) Prior Publication Data

US 2005/0016159 A1     Jan. 27, 2005

(51) Int. Cl.[7] .............................................. F16K 51/00
(52) U.S. Cl. ............ 251/298; 137/625.65; 137/625.21; 137/625.44
(58) Field of Search ................. 251/30.01, 30.02, 251/25, 298; 137/625.65, 625.21, 625.44

(56) References Cited

U.S. PATENT DOCUMENTS

| | | | | |
|---|---|---|---|---|
| 5,065,718 A | * | 11/1991 | Suzuki et al. ............ | 251/30.03 |
| 5,133,386 A | * | 7/1992 | Magee .................. | 137/625.65 |
| 5,172,547 A | | 12/1992 | Lawrence et al. | |
| 5,199,462 A | * | 4/1993 | Baker .................... | 137/625.44 |
| 5,345,758 A | | 9/1994 | Bussing | |
| 5,404,902 A | * | 4/1995 | Wen ........................ | 251/30.02 |
| 5,427,350 A | * | 6/1995 | Rinkewich ............... | 251/30.01 |
| 5,513,489 A | | 5/1996 | Bussing | |
| 5,557,926 A | | 9/1996 | Hunter, Jr. et al. | |
| 5,562,116 A | | 10/1996 | Henwood | |
| 5,873,240 A | | 2/1999 | Bussing et al. | |
| 5,937,902 A | | 8/1999 | Ohno et al. | |
| 6,186,175 B1 | * | 2/2001 | Frisch et al. ............ | 137/625.44 |
| 6,244,298 B1 | | 6/2001 | Sugita et al. | |
| 6,254,057 B1 | * | 7/2001 | Pubben et al. .......... | 137/625.25 |
| 6,273,135 B1 | * | 8/2001 | Loxley ......................... | 251/25 |
| 6,394,136 B1 | * | 5/2002 | Rohrbeck ............... | 137/625.44 |
| 6,427,967 B1 | * | 8/2002 | Evans ...................... | 251/30.02 |

* cited by examiner

Primary Examiner—John Bastianelli
(74) Attorney, Agent, or Firm—DeMont & Breyer, LLC

(57) ABSTRACT

A rotary-acting valve is disclosed. In some embodiments, the rotary-acting valve is the pilot or first stage of a two-stage control valve and can be used to create an improved propulsion system for a missile. In the illustrative embodiment, the rotary-acting pilot valve comprises a movable rotor that resides in a chamber. The chamber includes three ports: a gas inlet port, a control volume port that couples to the second stage of a two-stage valve, and a gas vent port. The rotor in the pilot valve selectively pneumatically couples the second stage to either the gas inlet port or the gas vent port. When the second stage is connected to the gas inlet port, a piston (part of the second stage valve) moves to a blocking position in which it blocks the mouth of a thrust nozzle. When the second stage is coupled to the gas vent port, the piston moves to a non-blocking position with respect to the mouth of the thrust nozzle.

18 Claims, 4 Drawing Sheets

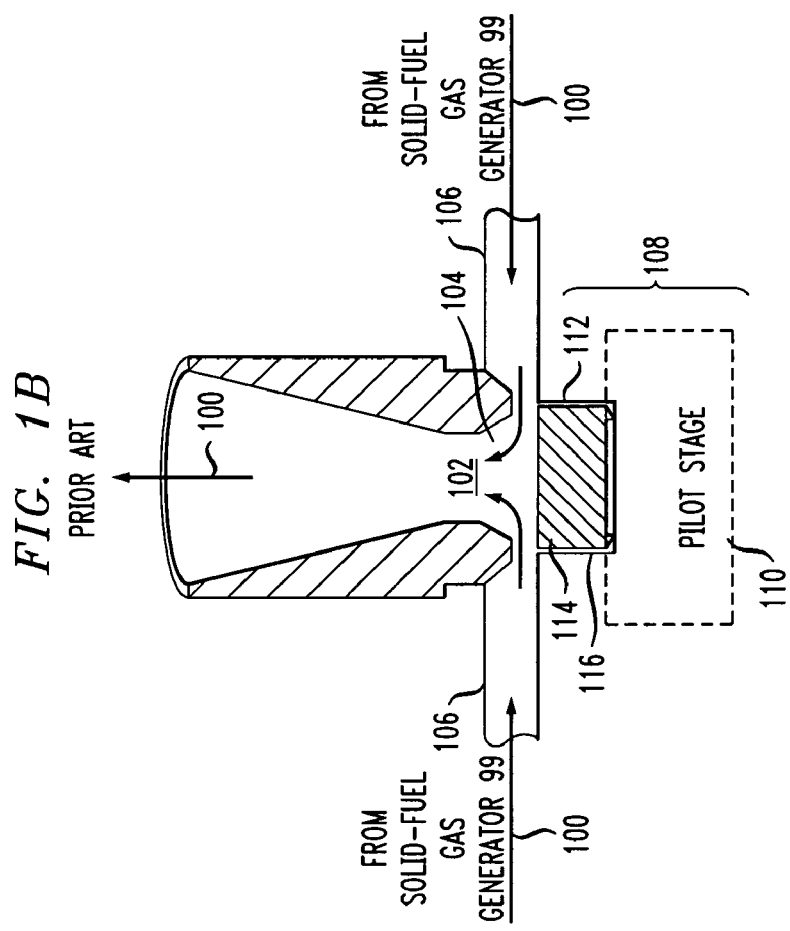
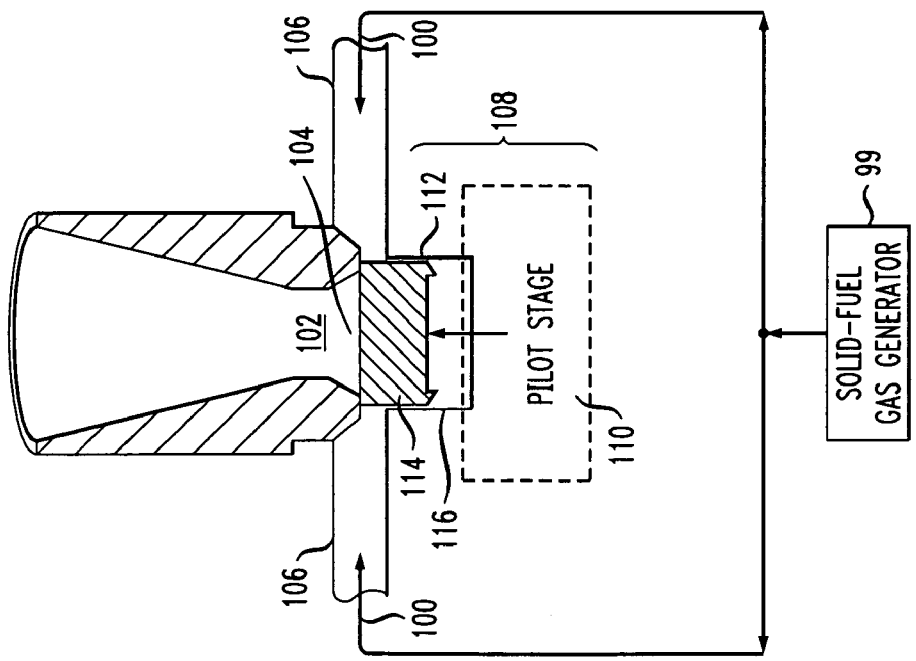

APPARATUS COMPRISING A ROTARY-ACTING PILOT VALVE

FIELD OF THE INVENTION

The present invention relates generally to valves.

BACKGROUND

Solid-fuel gas generators are often used in missiles and rockets to produce hot, high-pressure gas to use as propellant. In some systems, the hot gas is fed to a secondary combustor where it mixes within an in-flowing oxidant, such as air. The gas burns in the secondary combustor and is then exhausted from a thrust nozzle. In some other systems, a secondary combustor is not present; the gas generated by the solid-fuel gas generator is simply delivered to and exhausted from the thrust nozzle.

It is often necessary to vary a missile's attitude and speed during flight. For missiles that are powered by solid-fuel gas generators, this requires regulating the gas flow during flight, since the gas-generating reaction is uncontrolled. The gas flow can be regulated using a hot-gas control valve.

In some propulsion systems, the hot-gas control valve is positioned to regulate the flow of gas into the combustor. In some other systems, the control valve is positioned to regulate the flow of gas to the thrust nozzle. In yet some other systems, control valves regulate gas flow to both the combustor and the nozzle.

FIGS. 1A and 1B depict a simplified schematic of a conventional solid-fuel-sourced propulsion system that includes solid-fuel gas generator 99 for generating propulsion gas 100 and two-stage hot-gas control valve 108 for regulating the flow of gas 100 to thrust nozzle 102. A two-stage valve is often used for this service (as opposed to a single-stage valve) as a way to reduce valve-actuator power requirements or improve valve response time. FIG. 1A depicts two-stage valve 108 in a "closed" state, wherein gas 100 is prevented from entering mouth 104 of nozzle 102. FIG. 1B depicts valve 108 in an "open" state, wherein gas 100 is permitted to enter mouth 104 of nozzle 102.

Two-stage control valve 108 includes "first stage" or "pilot valve" 110 and "second stage" or "main-stage valve" 112. The structure of pilot valve 110 is not depicted in FIGS. 1A and 1B; pilot valve 110 is typically one of several known valve types, such as a flapper valve, spool valve or the like. In the illustration, second stage 112 is a linearly-acting, piston-in-bore arrangement.

Regardless of its particular configuration, pilot valve 110 actuates second stage 112 of the two-stage valve 108 depicted in FIGS. 1A and 1B. In the state depicted in FIG. 1A, pilot valve 110 causes piston 114 to move "upwards" in bore 116, sealing mouth 104 of nozzle 102. This prevents gas 100 in conduit 106 from entering nozzle 102. In the state depicted in FIG. 1B, pilot valve 110 causes piston 114 to move "downwards" in bore 116, such that mouth 104 of nozzle 102 is open. In this state, gas 100 flows into nozzle 102. Piston 114 can actuated pneumatically, electromechanically, or via other modalities.

As conventionally implemented, pilot valve 110 must overcome certain forces to operate. For example, if pilot valve 110 is a flapper valve, the valve element (i.e., the "flapper,") must typically "lift" against a pressure load. And while some valves are statically pressure balanced, they are usually not dynamically pressure balanced. When used for aeronautical applications, such as in a missile, most conventional implementations of pilot valve 110 must also contend with g-forces.

Overcoming these loads necessitates an increase in the power required for actuation relative to what would otherwise be necessary. Consequently, it would be desirable to provide a valve (e.g., a pilot valve for a two-stage, hot-gas control valve, etc.) that is configured such that it does not lift against a pressure load, is substantially insensitive to g-loads, and is immune from pressure imbalances.

SUMMARY

The illustrative embodiment of the present invention is a propulsion system that incorporates a rotary-acting pilot valve that avoids some of the disadvantages of the prior art. In the illustrative embodiment, the rotary-acting pilot valve functions as the first stage of a two-stage, hot-gas control valve that regulates a flow of gas propellant to a thrust nozzle.

In accordance with the illustrative embodiment, the rotary-acting pilot valve comprises a rotor that resides in a chamber. The rotor is supported within the chamber in such a way that it is capable of rotating about a pivot point or axis. The chamber includes three ports: a gas inlet port, a gas vent port, and a control volume port.

The pilot valve actuates the second stage (of the control valve), which is depicted illustratively as a bore in which a main-stage piston resides. It is the second stage, and in particular the position of the main-stage piston, which actually regulates the flow of gas propellant to the thrust nozzle.

The pilot valve pneumatically actuates the second stage by alternately pressurizing or depressurizing a control volume via the control volume port. In the illustrative embodiment, the control volume is the bore in which the main-stage piston resides. By way of additional detail, a small portion of gas is withdrawn from the main flow of gas propellant and is diverted to the gas inlet port of the chamber. In the illustrative embodiment, the pilot valve's rotor selectively pneumatically couples the control volume to either the gas inlet port or the gas vent port. When the control volume is coupled to the gas inlet port, the control volume is pressurized by the inlet gas. This forces the piston "upwards" in the bore into a blocking position in which it prevents access to the mouth of the thrust nozzle. On the other hand, when the control volume couples to the gas vent port, it depressurizes. Upon depressurization, the piston retracts within the bore into a non-blocking position with respect to the mouth of the thrust nozzle.

Unlike most prior art valves, the rotary-acting pilot valve described herein is configured and dimensioned so that the flow of gas is substantially perpendicular to the direction of rotation of the rotor and substantially parallel to its long axis. Due, at least in part, to this arrangement, a rotary-acting pilot valve in accordance with the illustrative embodiment is not required to lift against a pressure load, is substantially insensitive to g-loads and is relatively immune from pressure imbalances.

It is also notable that there is no contact between the rotor (i.e., the valve element) and a seat surface. That is, a slight amount of leakage is permitted and expected. Another important aspect of a multi-stage valve that incorporates the rotary-acting pilot valve described herein is that, rather than controlling a large flow of gas, it controls a small flow of gas into and out of a control volume (i.e., the cylinder). Consequently, the rotary-acting pilot valve requires a relatively small actuation force to move the rotor and, hence, consumes relatively little electromagnetic power.

These and other features of the illustrative embodiment of the present invention are described in detail in the following Detailed Description and depicted in the appended Drawings.

BRIEF DESCRIPTION OF THE DRAWINGS

FIG. 1A depicts a conventional propulsion system including a hot-gas control valve, which is shown in a closed state.

FIG. 1B depicts the hot-gas control valve of FIG. 1A, wherein the valve is shown in an open state.

DETAILED DESCRIPTION

The illustrative embodiment of the present invention is a propulsion system that incorporates a rotary-acting valve. In the illustrative embodiment, the rotary-acting valve is used as the "pilot" or first stage of a two-stage, hot-gas control valve for controlling a flow of gas propellant to a thrust nozzle in a rocket or missile. The gas propellant, which in the illustrative embodiment is generated from a solid-fuel gas generator, is typically quite hot (e.g., about 2500+° F.) and is at high pressure (e.g., about 500 to 2000 psi).

It will be understood that the rotary-acting valve described herein can be used for other applications. For example, the rotary-acting pilot valve can be used in other services in a missile or rocket (e.g., to control the flow of gas from solid-fuel gas generators to a secondary combustion chamber, etc.) and for non-aeronautical applications (e.g., laboratory instrumentation, processing plants, etc.). Non-aeronautical applications will typically involve far less severe temperature and pressure environments, so that issues relating to materials selection and thermal design become less critical. It is within the capabilities of those skilled in the art to appropriately select materials and develop a thermal design consistent with the prevailing operating conditions.

Figure 2B:
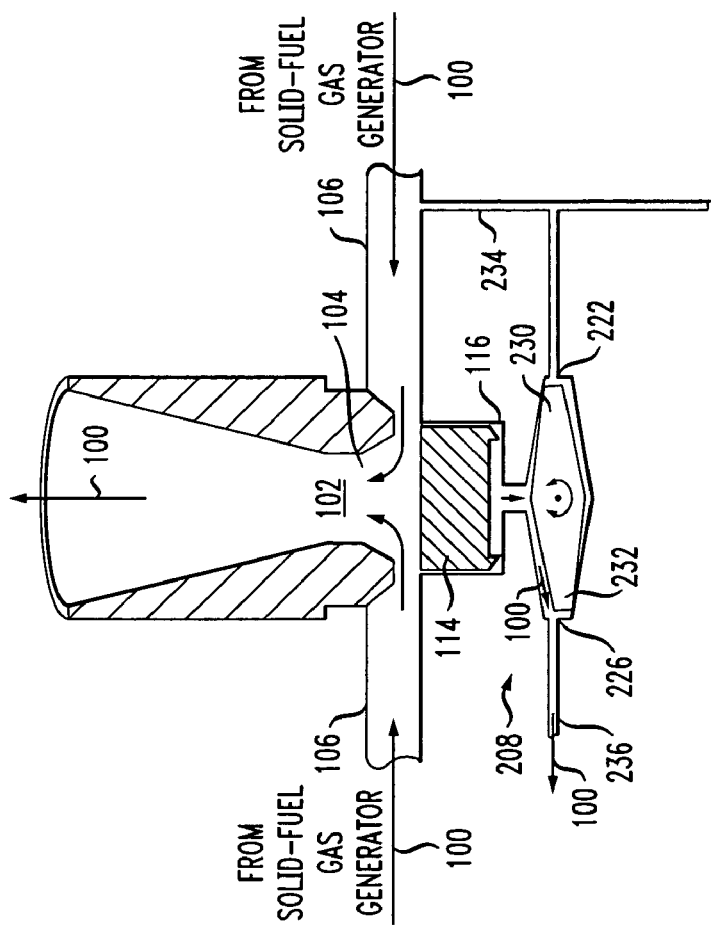
FIG. 2B depicts the hot-gas control valve that is shown in FIG. 2A in an open state.
Figure 2A:
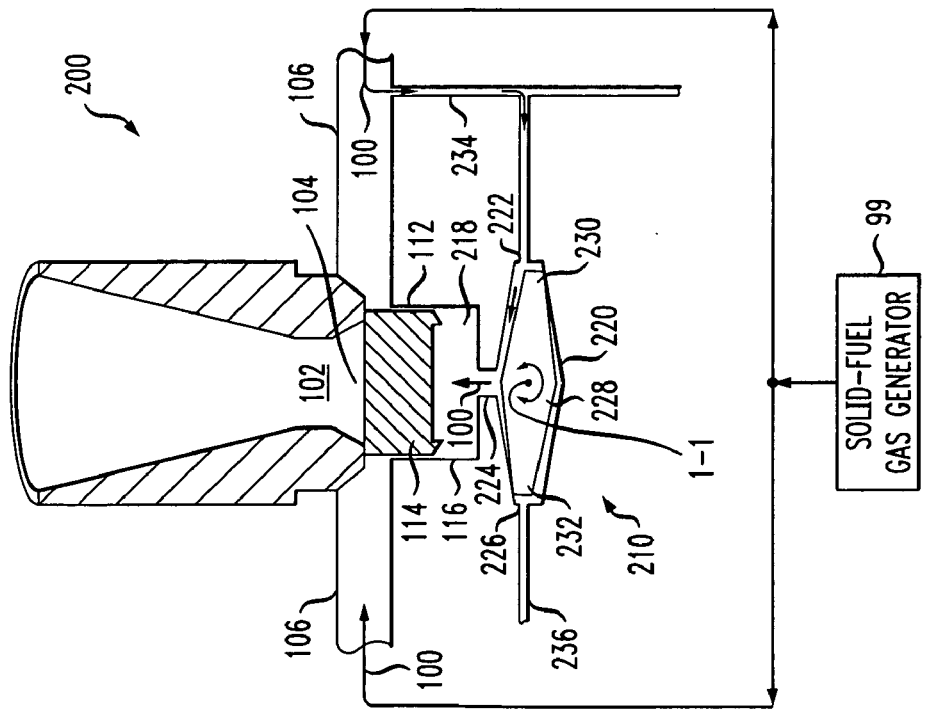
FIG. 2A depicts a propulsion system having a hot-gas control valve that incorporates a rotary-acting pilot valve in accordance with the illustrative embodiment of the present invention, wherein the control valve is shown in a closed state.
Figure 3:
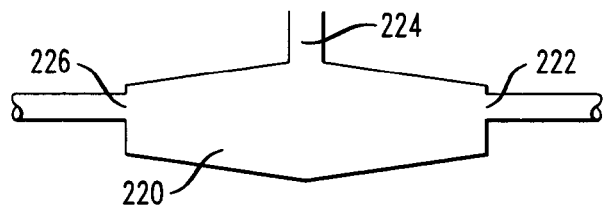
FIG. 3 depicts a chamber of the illustrative rotary-acting pilot valve.

FIGS. 2A and 2B depict propulsion system 200, which incorporates hot-gas control valve ("HGCV") 208 in accordance with the illustrative embodiment of the present invention. In the illustrative embodiment, HGCV 208 regulates a flow of gas propellant 100 into thrust nozzle 102. FIG. 2A depicts HGCV 208 in a "closed" state in which it prevents gas from flowing into mouth 104 of nozzle 102. FIG. 2B depicts HGCV 208 in an "open" state. In the open state, HGCV 208 permits gas 100 to flow into mouth 104 of nozzle 102.

HGCV 208 is a two-stage valve comprising "first-stage" or "pilot" valve 210 and "second-stage" valve 112. Second-stage valve 112 controls the flow of gas 100 into mouth 104 of nozzle 102 while pilot valve 210 actuates or controls second-stage valve 112. As described further below, pilot valve 210 actuates second-stage valve 112 by regulating the flow (into the second-stage valve, and more particularly into a control volume) of a small portion of gas taken from the main flow of gas 100.

With continued reference to FIGS. 2A and 2B, second-stage valve 112 comprises bore 116 and piston 114. Bore 116 can have any suitable shape (e.g., cylindrical, square, etc.) with piston 114 having a complementary shape. In some embodiments, the bore and piston can be keyed to prevent rotation.

Piston 114 piston moves linearly within bore 116 between a first position and a second position, as defined below. In the first position, which is depicted in FIG. 2A, piston 114 moves "upwards" in bore 116 into a blocking position in which it closes off mouth 104 of nozzle 102. Doing so prevents gas 100 from entering the nozzle. In the second position, which is depicted in FIG. 2B, piston 114 moves "downwards," retracting into bore 116 into a non-blocking position. In this position, gas 100 in conduit 106 can enter nozzle 102. As described further below, the position (first or second) of piston 114 depends upon the state of pilot valve 210.

Figure 4:
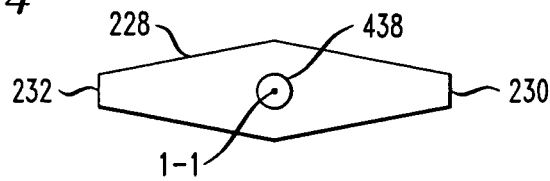
FIG. 4 depicts a top view of a rotor of the illustrative rotary-acting pilot valve.

Referring now to FIGS. 2A through 7, pilot valve 210 comprises chamber 220 (FIG. 3, etc.) and rotor 228 (FIG. 4, etc.). The rotor resides within the chamber (FIGS. 2A, 2B, 6, and 7). In the illustrative embodiment, rotor 228 and chamber 220 have an elongated, hexagonal shape. The short sides of rotor 228 define a first end 230 and second end 232 (of rotor 228).

Figure 5:
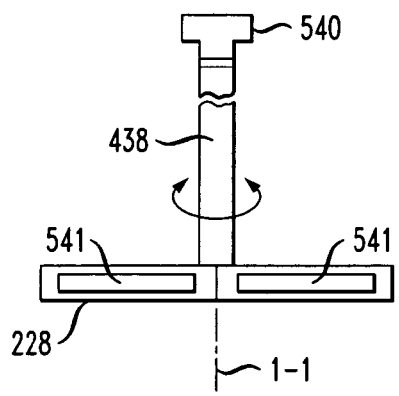
FIG. 5 depicts a side view of the rotor of FIG. 4.

Rotor 228 is supported within chamber 220 so that it is capable of rotating about axis or pivot point 1-1 (FIGS. 4, 5, etc.). In the illustrative embodiment, rotor 228 is supported by drive shaft 438, which aligns with axis 1-1. Drive shaft 438 couples rotor 228 to actuator 540 (FIG. 5). In the illustrative embodiment, actuator 540 is a stepper motor. In some other embodiments, different types of actuators and different actuating arrangements are used. For example, in some embodiments, rotor 228 is actuated by two pairs of solenoids (not depicted) that sandwich it—one pair at first end 230 and the second pair at second end 232.

Chamber 220, which houses rotor 228, includes three ports: gas inlet port 222, control volume port 224 to second stage 112, and gas vent port 226. With reference to FIGS. 2A and 2B, inlet port 222 pneumatically couples chamber 228 to conduit 106 via conduit 234. For use in this specification, including the appended claims, the term "pneumatically coupled" means that the pressure or flow of gas/vapor in one region affects the pressure or flow conditions in another region. Typically, although not necessarily, pneumatically-coupled regions are physically connected to one another by orifice(s) or conduit such that a continuous path from one region to the next is established.

Control volume port 224 pneumatically couples chamber 228 to second stage valve 112, and, more particularly, to control volume 218 within bore 116. For use in this specification, including the appended claims, the phrase "control volume" means a region between the bottom of piston 114 and the bottom of bore 116. The size of the control volume varies as piston 114 moves within bore 116. Vent port 226 physically couples chamber 228 to vent line 236. The vent line is typically pneumatically coupled to a low-pressure region (e.g., overboard from the missile to local atmospheric pressure, etc.).

Due in part to the physical relationships described above, rotor 228 is capable of performing the following functions: (1) pneumatically coupling gas inlet port 222 to control volume 218 and (2) pneumatically coupling control volume 218 to gas vent port 226. By virtue of this functionality, pilot valve 210 controls the pressure in (i.e., flow to) bore 116. In response, control volume 218 alternatively either enlarges or contracts, moving piston 114 within bore 116. In this way, pilot valve 110 actuates second stage valve 112. This functionality is described further below.

Figure 6:
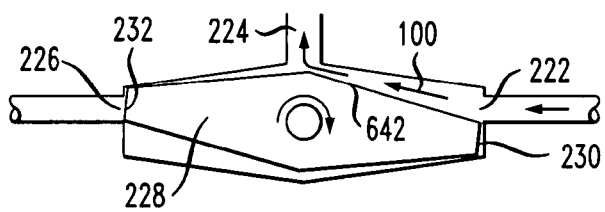
FIG. 6 depicts the illustrative rotary-acting pilot valve in a "pressurize" state in which it pneumatically couples a gas inlet port to the second stage of the hot-gas control valve of FIG. 2A.

FIGS. 2A and 6 depict pilot valve 210 in a "pressurize" state in which it performs function (1)—pneumatically coupling gas inlet port 222 to control volume 218. In FIGS. 2A and 6, rotor 228 is positioned so that inlet port 222 is open (i.e., not blocked by first end 230 of rotor 228) while vent port 226 is closed (i.e., blocked by second end 232 of rotor 228).

When inlet port 222 is open, a small portion of gas (about 1 to 10 volume percent of the total amount of gas 100 in conduit 106) flows from conduit 106 to conduit 234 and through inlet port 222 into chamber 220. Once in chamber 220, the gas flows past long side 642 of rotor 228, through control volume port 224 and into control volume 218 within cylinder 116. As gas 100 flows into control volume 218, the control volume (i.e., bore 116) pressurizes, forcing piston 114 "upwards" until it contacts and seals mouth 104 of nozzle 102. Thus, when pilot valve 210 is in the pressurize state (i.e., gas inlet port 222 is open), control valve 208 closes, preventing gas propellant 100 from entering nozzle 102.

Figure 7:
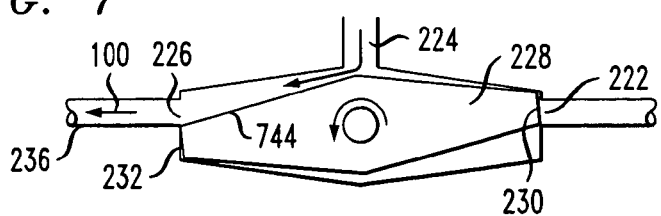
FIG. 7 depicts the illustrative rotary-acting pilot valve in a "depressurize" state in which it pneumatically couples the second stage to a gas vent port.

FIGS. 2B and 7 depict pilot valve 210 in a "depressurize" state in which it performs function (2)—pneumatically coupling control volume 218 to vent port 226. In FIGS. 2B and 7, rotor 228 is positioned so that inlet port 222 is closed (i.e., blocked by first end 230 of rotor 228) while vent port 226 is open (i.e., not blocked by second end 232 of rotor 228). Consequently, gas flows from control volume 218 through outlet port 224, past long side 744 of rotor 228, through vent port 226 and into vent line 236. As gas 100 flows out of control volume 218, bore 116 depressurizes. This depressurization causes piston 114 to drop, thereby opening mouth 104 of nozzle 102. As such, when pilot valve 210 is in the depressurize state (i.e., gas inlet port 222 is closed), control valve 208 opens, permitting gas propellant 100 to enter nozzle 102.

Figure 8:
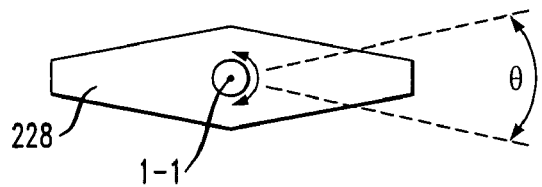
FIG. 8 depicts the rotation angle of the rotor.

Rotor 228 and its operation are now described in further detail. To move between the two positions described above (i.e., either blocking gas inlet port 222 or blocking vent port 226), rotor 228 rotates or pivots about axis 1-1. In some applications, it is desirable for pilot valve 210 to have a response time,τ, in the range of about 1 to 3 milliseconds. Consequently, rotation angle θ should be small, for example, in a range of about 3° to about 10° (see FIG. 8). Rotation of rotor 228 is, therefore, not a continuous rotation as in most rotary valves, but rather an oscillatory motion.

Unlike most valves, a slight amount of leakage is permitted and expected in pilot valve 210. The leakage occurs since rotor 228 does not contact a "seat" when it blocks inlet port 222 or vent port 226. To keep the leakage low, rotor 228 and chamber 220 should be manufactured with high precision so that there is a very small gap between end 230 of rotor 228 and gas inlet port 222 and end 232 of rotor 228 and gas vent port 226. In some embodiments, the gap between an end of rotor 228 (i.e., first end 230 and second end 232) and the interior wall of chamber 220 near inlet and vent ports is about 0.0005 inches. Leakage in an amount of about 10 percent or less (volumetric flow) is readily achievable and will be acceptable in most cases. As previously disclosed, the amount of flow entering pilot valve 210 is quite small such that the actual amount of leakage is a very small quantity of gas.

Parameters such as the dimensions of rotor 228 and the flow area of inlet port 222 are primarily based on the desired response time,τ, and rotation angle θ. The torque required to actuate rotor 228 is calculated based on the rotor's angular acceleration and moment of inertia in known fashion. In some embodiments, rotor 228 includes open or "cut-out" regions 541 (FIG. 5). The cut-out regions reduce the mass of rotor 228 and, hence, reduce the power required for actuation. Those skilled in the art will be able to design and construct illustrative pilot valve 210 in view of the present disclosure.

When pilot valve 210 is used as the first stage in a hot-gas control valve, particular attention must be paid to the thermal design of the pilot valve. In particular, the pilot valve must be able to withstand the high temperatures (about 2500 to 4000° F.) and high pressures (about 500 to 2000 psig) of the gas propellant. For such an application, the constituent components of pilot valve 210 (e.g., rotor 228, chamber 220, etc.) are typically made from refractory metals, ceramics, carbon-carbon, or similar high-temperature materials. Additionally, a suitable pressure seal must be used on the rotor drive shaft (i.e., drive shaft 438). In some embodiments, graphite seal rings are used to seal the drive shaft.

Furthermore, the thermal expansion of rotor 228 and the inside wall of chamber 220 must be considered in view of the very small gap between those elements. In some embodiments, relative thermal expansion is controlled by fabricating rotor 228 and chamber 220 from the same material, thereby matching their thermal expansion coefficients. In some other embodiments, materials and configurations are appropriately selected, in known fashion, such that the combination of the thermal expansion coefficient(s) and thermal inertia maintains an approximately constant gap during operation. This is sometimes referred to as "thermal transient design." In yet some other embodiments, known thermal compensation mechanisms are incorporated into rotor 228, chamber 220, or both, to maintain an approximately constant gap over a range of temperatures.

Figure 9:
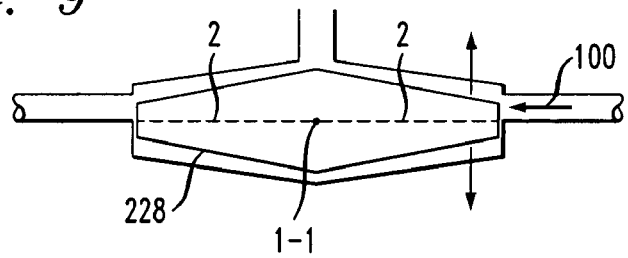
FIG. 9 depicts the point of first contact between gas and the rotor, and illustrates that at this point of contact, the direction of rotation of the rotor is substantially perpendicular to the direction in which the gas flows.

By way of summary, illustrative pilot valve 210, and multi-stage valves that incorporate it (e.g., HGCV 208, etc.) incorporate a number of distinctive features that provide a number of benefits. For example, illustrative pilot valve 210 incorporates the following features:

Gas 100 flows toward or "into" pivot point 1—1, substantially parallel to long axis 2—2 of rotor 228, and substantially perpendicular to the direction of rotation (see, FIG. 9).

Figure 10:
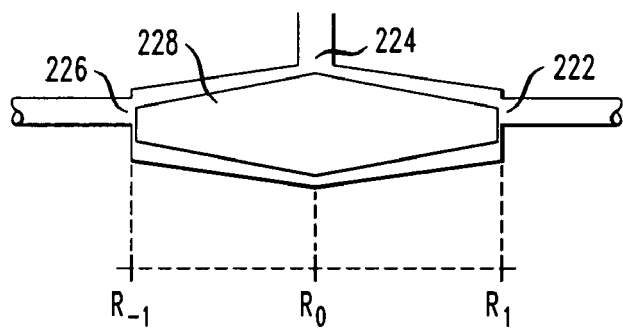
FIG. 10 depicts the rotary-acting pilot valve and highlights the relative radial locations (along the rotor) of the gas inlet port, control volume port, and gas vent port.

Control volume port 224 is at a different "radius" or location ($R_0$) along rotor 228 than inlet port 222 ($R_1$) and vent port 226 ($R_2$) (see, FIG. 10).

Rather than controlling a large flow of gas in conduit 106, pilot valve 210 controls the flow of a small amount of gas into and out of a control volume (i.e., control volume 218B).

There is no contact between rotor 228 and a seat surface.

As a consequence of these and other features, some embodiments of pilot valve 210 and multi-stage valves that incorporate it offer at least some of the following advantages:

They do not lift against a pressure load.
They are substantially insensitive to g-loads.
They are immune from pressure imbalances.
They require little actuation force (hence low electromagnetic power consumption).
They have pneumatically-assisted actuation.
They exhibit a slight amount of leakage, which is not problematic and is, in fact, expected.

Figure 11:
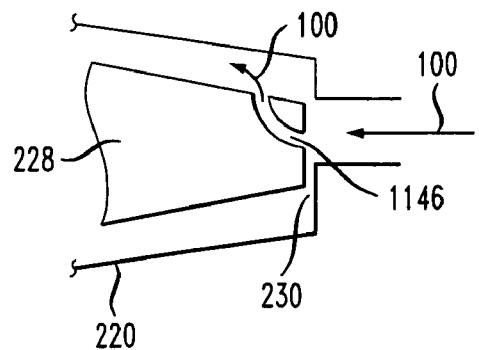
FIG. 11 depicts a variation of the rotor that is shown in FIG. 4, wherein a passage is disposed at the end of the rotor nearest the gas inlet port.

FIG. 11 depicts a variation of rotor 228 wherein the structure of the rotor itself facilitates pneumatically-assisted actuation. In particular, rotor 228 includes passage 1146. The passage conducts a small amount of gas 100 to the region "above" end 230 of rotor 228, whose flow generates a small thrust, and hence torque on rotor 228. The gas flow assists actuator 540 in rotating rotor 228 "downward" to open inlet port 222.

It is to be understood that the above-described embodiments are merely illustrative of the present invention and that many variations of the above-described embodiments can be devised by those skilled in the art without departing from the scope of the invention. For example, in some variations of the illustrative embodiment, the rotary-acting valve functions as a single-stage valve for any of a variety of services. And in some other variations of the illustrative embodiment, the rotary-acting valve serves as the first stage of a valve having more than two stages. It is therefore intended that such variations be included within the scope of the following claims and their equivalents.

I claim:

1. An apparatus comprising:
   a chamber, wherein:
   (i) said chamber has a first port, a second port, and a third port;
   (ii) no two of said ports are contiguous with one other and a rotor, wherein:
   (i) said rotor is disposed within said chamber;
   (ii) said rotor controls flow through said first port and said second port;
   (iii) said rotor pivots between a first position and a second position;
   (iv) in said first position, a relatively greater area for flow through said first port and a relatively lesser area for flow through said second port is provided, and in said second position, a relatively greater area for flow through said second port and a relatively lesser area for flow through said first port is provided, and wherein said relatively lesser area permits some amount of flow.

2. The apparatus of claim 1 wherein said third port is coupled to a control volume, and wherein in said first position of said rotor, said control volume is pressurized by said flow through said first port, and further wherein in said second position of said rotor, said control volume is depressurized by flow through said second port.

3. An apparatus comprising:
   a chamber, wherein said chamber has a gas inlet port, a gas vent port, and a control volume port; and
   a rotor, wherein:
   (i) said rotor is disposed within said chamber;
   (ii) said rotor has a first end and a second end;
   (iii) said rotor is positionable in a first position in which said second end of said rotor blocks more of said gas vent port than said first end of said rotor blocks of said gas inlet port, thereby permitting a first flow of gas to pressurize a control volume that is pneumatically coupled to said control volume port; and
   (iv) said first end of said rotor does not contact a seating surface when it is in said first position.

4. The apparatus of claim 3 further comprising:
   a bore, wherein said bore is pneumatically coupled to said control volume port; and
   a piston, wherein said piston is disposed in said bore, and wherein said control volume is defined within said bore between said piston and said control volume port.

5. The apparatus of claim 4 wherein said piston regulates a second flow of a gas into a nozzle, wherein said first flow of gas is less than 10 volume percent of said second flow of gas.

6. The apparatus of claim 3 wherein said rotor is positionable in a second position in which said second end blocks less of said gas vent port than said first end of said rotor blocks of said gas inlet port, thereby enabling the pressurized control volume to depressurize via said gas vent port.

7. The apparatus of claim 6 wherein when said rotor is in said first position, said piston is forced forward in said bore.

8. The apparatus of claim 6 wherein said rotor rotates about 10 degrees or less between said first position and said second position.

9. An apparatus comprising:
   a chamber, wherein said chamber is elongated, and wherein said chamber comprises a first port, and second port, and a third port, and wherein no two of said ports are contiguous with one another; and
   a rotor, wherein:
   (i) said rotor is disposed within said chamber;
   (ii) said rotor has an elongated shape that terminates at a first end and a second end thereof;
   (iii) said rotor pivots between a first position and a second position;
   (iv) in said first position, said second end substantially, but not completely, blocks said second port; and
   (v) in said second position, said first end substantially, but not completely, blocks said first port.

10. The apparatus of claim 9 wherein when said rotor pivots, a direction of motion of said rotor is substantially perpendicular to a direction of a first flow of said gas into said chamber.

11. The apparatus of claim 9 further comprising a bore, wherein said chamber is pneumatically coupled to said bore via said third port.

12. The apparatus of claim 11 further comprising a piston, wherein said piston is disposed in said bore, and further wherein said piston is movable between a first position and a second position.

13. The apparatus of claim 12 wherein in said first position of said rotor, said bore receives a first flow of gas, causing said piston to move to said first position.

14. The apparatus of claim 13 wherein in said second position of said rotor, gas flows out of said bore, causing said piston to move to said second position.

15. The apparatus of claim 13 further comprising a nozzle, wherein when said piston is in said first position, said piston blocks a second flow of gas into said nozzle.

16. The apparatus of claim 15 wherein when said piston is in said second position, said second flow of gas enters said nozzle.

17. The apparatus of claim 15 wherein said first flow of gas is withdrawn from said second flow of gas and is less,than ten volume percent of said second flow of gas.

18. An apparatus comprising:
a chamber, wherein said chamber has an inlet port, and control volume port and a vent port; and
a rotor, wherein:
 said rotor is disposed within said chamber;
 said rotor controls flow of gas through said inlet port and said vent port; and
 there is no contact between said rotor and any surface of that said chamber that would serve as a seat for preventing leakage, so that some amount of said gas flows through both said inlet port and said vent port, regardless of a position of said rotor.

* * * * *